United States Patent
Boutnaru

(10) Patent No.: US 10,666,618 B2
(45) Date of Patent: May 26, 2020

(54) ENHANCED SECURITY TECHNIQUES FOR REMOTE REVERSE SHELL PREVENTION

(71) Applicant: PAYPAL, INC., San Jose, CA (US)

(72) Inventor: Shlomi Boutnaru, Modiin (IL)

(73) Assignee: PAYPAL, INC., San Jose, CA (US)

( * ) Notice: Subject to any disclaimer, the term of this patent is extended or adjusted under 35 U.S.C. 154(b) by 376 days.

(21) Appl. No.: 15/267,037

(22) Filed: Sep. 15, 2016

(65) Prior Publication Data
US 2018/0077201 A1 Mar. 15, 2018

(51) Int. Cl.
*H04L 29/06* (2006.01)

(52) U.S. Cl.
CPC ...... *H04L 63/0263* (2013.01); *H04L 63/1408* (2013.01); *H04L 63/101* (2013.01)

(58) Field of Classification Search
CPC ... H04L 63/20; H04L 63/0263; H04L 63/101; H04L 63/1408; H04L 63/10
See application file for complete search history.

(56) References Cited

U.S. PATENT DOCUMENTS

| | | | | |
|---|---|---|---|---|
| 7,552,479 B1 * | 6/2009 | Conover | ............... | G06F 21/565 713/164 |
| 8,510,596 B1 * | 8/2013 | Gupta | ............... | G06F 11/073 714/15 |
| 8,683,576 B1 * | 3/2014 | Yun | ............... | G06F 21/53 726/17 |
| 9,736,182 B1 * | 8/2017 | Madhukar | ............... | H04L 63/20 |
| 2010/0205674 A1 * | 8/2010 | Zorn | ............... | G06F 21/552 726/25 |
| 2011/0219448 A1 * | 9/2011 | Sreedharan | ............... | G06F 21/00 726/23 |
| 2012/0222116 A1 * | 8/2012 | Chenette | ............... | G06F 21/54 726/23 |
| 2013/0081017 A1 * | 3/2013 | Bhattiprolu | ............... | G06F 8/65 718/100 |
| 2014/0283088 A1 * | 9/2014 | AlHarbi | ............... | G06F 21/64 726/26 |

(Continued)

OTHER PUBLICATIONS

Gilley, "Http://www.quora.conn/Don't-any-hash-funtions-return-the-same-value-for-the-same-input", Oct. 14, 2013. (Year: 2013).*

(Continued)

*Primary Examiner* — Tongoc Tran
(74) *Attorney, Agent, or Firm* — Haynes and Boone, LLP

(57) ABSTRACT

When a computer system is compromised by a malicious user, detecting or preventing the malicious user can improve the security and efficiency of the computer system, as well as prevent data from being deleted or corrupted and/or stolen. An attacker who compromises a computer system is likely to take certain actions to exert control over the computer or avoid detection. When a compromised system is behind a network firewall, the attacker may seek to open a remote reverse shell on the compromised system to more easily issue commands, as the firewall may block direct attempts from outside the network to contact the compromised system. Detecting a reverse shell can be difficult, slow, and unreliable, however. The present disclosure discusses methods for detecting reverse shells based on analyzing redirection of data streams such as STDIN, STDOUT, and STDERR.

20 Claims, 5 Drawing Sheets

(56) References Cited

U.S. PATENT DOCUMENTS

| | | | | |
|---|---|---|---|---|
| 2015/0326592 | A1* | 11/2015 | Vissamsetty | H04L 63/1408 726/24 |
| 2017/0139782 | A1* | 5/2017 | Chen | G06F 11/1469 |
| 2017/0270296 | A1* | 9/2017 | Kraemer | G06F 9/451 |
| 2017/0339166 | A1* | 11/2017 | Althouse | H04L 63/1416 |
| 2018/0268142 | A1* | 9/2018 | Sethumadhavan | H04L 63/0428 |

OTHER PUBLICATIONS

Unknown, "Bash One-Liners Explained, Part III: All about redirections" [Online] [retrieved on Oct. 16, 2017]. Retrieved from the Internet: <URL: http://www.catonmat.net/blog/bashonelinersexplainedpartthree/>.

Unknown "File descriptor"[Online].Wikipedia [retrieved on Aug. 15, 2016]. Retrieved from the Internet: <URL: https://en.wikipedia.org/wiki/File_descriptor>.

Hammer, Richard "Inside-Out Vulnerabilities, Reverse Shells" [Online]. SANS Institute [retrieved on Aug. 15, 2016]. Retrieved from the Internet: <URL: https://www.sans.org/reading-room/whitepapers/covert/inside-out-vulnerabilities-reverse-shells-1663>, 2006.

Hammer, Richard "Reverse Shells Enable Attackers to Operate from Your Network" [Online] [retrieved on Aug. 15, 2016]. Retrieved from the Internet: <URL: https://www.sans.edu/student-files/presentations/LVReverseShell.pdf>.

Unknown "Reverse Shell Cheat Sheet" [Online] [retrieved on Aug. 15, 2016]. Retrieved from the Internet: <URL: http://pentestmonkey.net/cheatsheet/shells/reverseshellcheatsheet>.

Vanbuskirk, Peter "Advanced Methods to Detect Advanced Cyber Attacks: Protocol Abuse" [Online]. Novetta Nexus Blog [retrieved on Oct. 16, 2017]. Retrieved from the Internet: <URL: http://www.novetta.com/2015/02/advancedmethodstodetectadvancedcyberattacksprotocolabuse/>, Feb. 10, 2015.

* cited by examiner

ENHANCED SECURITY TECHNIQUES FOR REMOTE REVERSE SHELL PREVENTION

TECHNICAL FIELD

This disclosure relates to computer system security. More particularly, this disclosure relates to enhanced techniques for detecting and/or mitigating remote reverse shells or other types of remotely executed shellcodes or executables.

DETAILED DESCRIPTION

Figure 1:
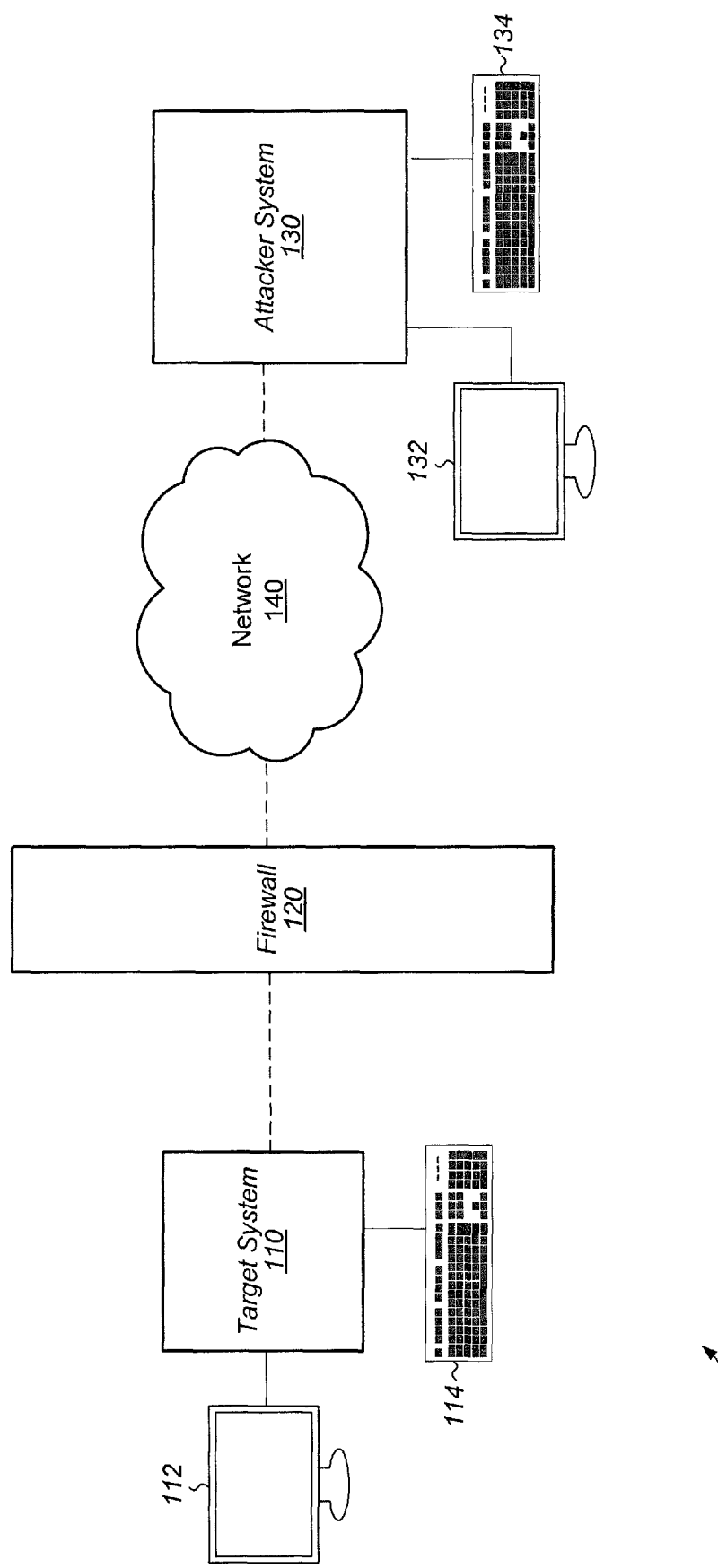
FIG. 1 illustrates a block diagram of a system that includes a target system, firewall, and attacker system, according to some embodiments.

One area of concern in computer security technology is mitigating damage when a computer system is compromised by a malicious and/or unauthorized party. Of particular concern is when a computer system is compromised and an attacker obtains the ability to execute arbitrary commands. If an attacker cannot be identified, however, it may be difficult or impossible to prevent or mitigate their actions.

An attacker who compromises a computer system is likely, in various circumstances, to take certain types of actions that will allow him to more effectively exert control over the computer or avoid detection. One circumstance that may occur is an attacker compromising a system that is behind a firewalled network. While the attacker may be able to remotely control parts of the compromised system, a firewall can prevent the attacker from initiating a direct connection to the system from outside the network.

In such circumstances, it may be desirable for the attacker to initiate a "reverse shell" from the compromised system to another system elsewhere on the internet. A reverse shell, in various embodiments, is a command shell that executes locally on the compromised system, but has at least its standard input redirected to a remote device (the command shell can also have standard output/error pointing to a network resource). In other words, instead of the shell executing on the system and receiving inputs via local keyboard and outputting data to a computer monitor physically attached to the system, the shell receives its inputs (and transmits its outputs) to a network address. Because the reverse shell is executing on the compromised machine behind a firewall, an outside attacker can avoid firewall/NAT (network address translation) devices because an initial data transmission may emanate from inside the network.

Detecting a reverse shell can be difficult and slow. One technique for detecting a reverse shell includes analyzing network traffic to see if a system has a pattern of network behavior that indicates it may be potentially compromised. This approach may require analyzing a large amount of network traffic, however, and can be difficult to implement depending on network configuration. Further, encrypted network traffic (e.g., HTTPS) cannot readily be inspected to determine packet contents, which can make network based reverse shell detection even more difficult, in various circumstances. Another potential problem with remote reverse shells is that an encrypted channel, in addition to command/control scenarios, is the possibility of reading data from a compromised machine (as input) and transmitting that data back to an attacker. Input data could be read from social networks and posted back to the attacker as output, for example. Network based detection can also be difficult when a machine that is compromised is one that ordinarily initiates outbound web network traffic (e.g., user desktop or laptop computer, or smart phone for an employee).

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown. In this diagram, system 100 includes a target system 110, a firewall 120, an attacker system 130, and a network 140.

As shown, target system 110 may be any type of computer system that resides behind firewall 120. Target system 110 may be on a corporate intranet, for example, that is at least partially protected from intrusion by firewall 120.

Firewall 120 is in turn connected to network 140, which includes all or a portion of the Internet, in various embodiments. Attacker system 130 is also connected to network 140. Note that various other networks and/or networking equipment may be present in a number of embodiments, but is not shown in FIG. 1 for simplicity.

In the embodiment of FIG. 1, attacker system 130 may attempt to compromise target system 110 using a number of techniques. Attacker system 130 (or another suitable system) could send a phishing email, for example, that is opened by a user of target system 110. This could result in target system 110 opening a malicious executable or opening a web page that exploits a software vulnerability on target system 110.

Target system 110 can therefore become compromised by attacker system 130 (or another system). Having control of target system 110, a malicious user of attacker system 130 may wish to be able to more fully exploit the resources of target system 110 (files, network connections, etc.) to gain greater access.

Firewall 120 presents a difficulty for attacker system 130, however, in that it will prevent attacker system 130 from directly connecting to a network port on target system 110, in various embodiments. Firewall 120 is configured to block outside data coming in unsolicited from network 140 in the embodiment of FIG. 1, but can allow data in when target system 110 (or another system behind the firewall) has initiated a connection itself. A typical example would be target system 110 contacting a web site on outbound port 80 or port 443 (HTTP/HTTPS), and then firewall 120 allowing the contacted web site to respond on those ports back to target system 110. (Note that in some embodiments, firewall 120 may be configured to block some ports but not others, or to allow inbound data on certain ports destined for certain machines, but not others).

Accordingly, because firewall 120 can prevent attacker system 130 from directly contacting target system 110, a malicious user of attacker system 130 will frequently want to open a reverse shell on target system 110.

An attacker who has managed to compromise target system 110 may therefore launch a command shell on that system, such as bash, ksh, zsh, csh, tcsh, dash, fish, cmd.exe, Powershell, or any other command shell. Ordinarily, when such a command shell (or any program which gets an executable path and creates a new process which runs the executable) is launched in various embodiments, it would receive input from keyboard 114 (an input device) and give output to monitor 112 (an output device). The STDIN file stream thus might point to keyboard 114, while the STDOUT and STDERR file streams might point to monitor 112.

In a reverse shell, however, a user of attacker system 130 may cause a command shell on target system 110 to have its streams redirected. Thus, instead of STDIN getting data from keyboard 114, it could be set to get data over network 140 from keyboard 134 (attached to attacker system 130). Likewise, STDOUT and STDERR could be set to transmit data over network 140 where it would appear on monitor 132 (also attached to attacker system 130).

Figure 2:
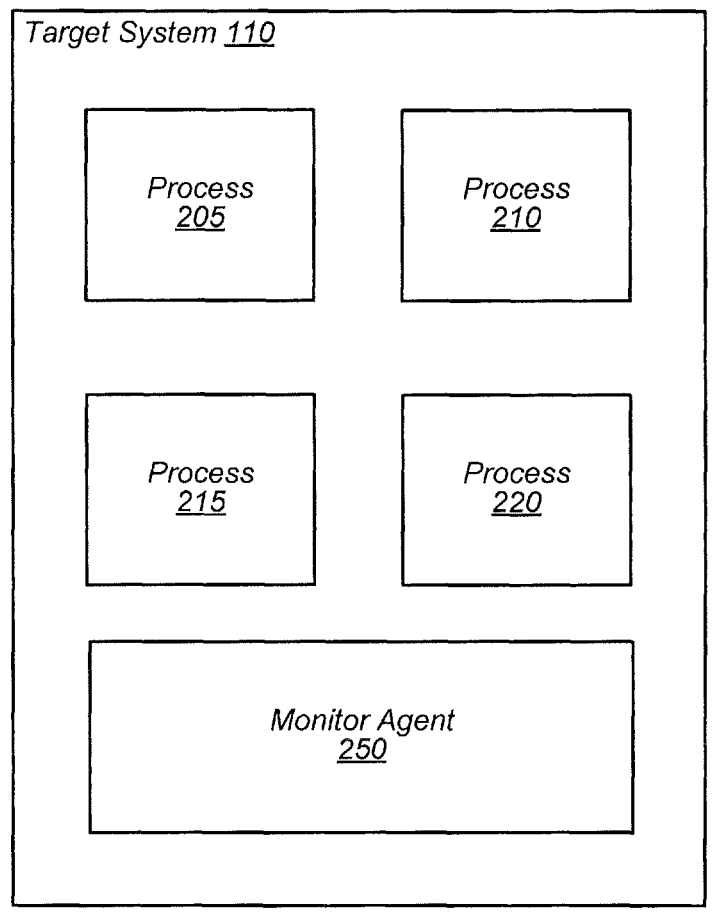
FIG. 2 illustrates a block diagram of a target system, according to some embodiments.

Turning to FIG. 2, one embodiment of target system 110 is shown. In this embodiment, target system 110 executes several different processes, including processes 205, 210, 215, and 220 (205-220). It also executes a monitor agent 250, which may be used to monitor processes 205-220. In various embodiments, monitor agent 250 may therefore allow various behavior of other running processes to be observed (which can allow a reverse shell to be detected). Monitor agent 250 may also take one or more remedial actions, in various embodiments.

Figure 3:
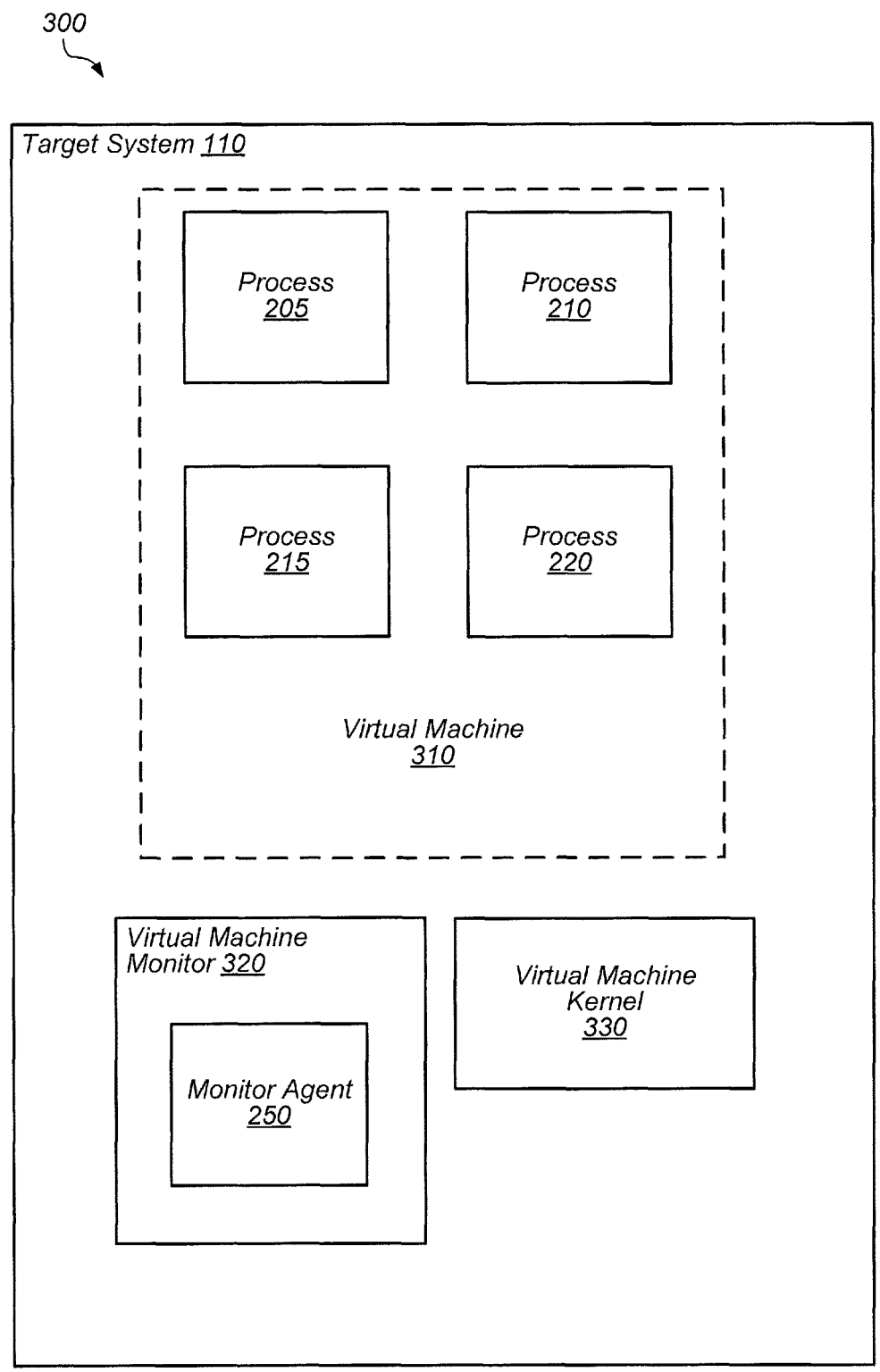
FIG. 3 illustrates a block diagram of another embodiment of a target system, according to some embodiments.

Turning to FIG. 3, another embodiment of target system 110 is shown in which target system 110 is configured to run one or more virtual machines.

As shown, processes 205-220 are being executed within virtual machine 310. Additional virtual machines not depicted may also be running on target system 110.

Virtual machine monitor 320 is a process that is executing outside virtual machine 310 in this embodiment. Thus, virtual machine monitor 320 may allow for virtual machine introspection on virtual machine 310. Virtual machine introspection allows various aspects—process data, instructions, memory, etc. of virtual machine 310 to be observed from outside the virtual machine itself. Monitor agent 250 is included within virtual machine monitor 320 in the embodiment shown, though may also be a different process outside of virtual machine 310 in various other embodiments. By using virtual machine introspection techniques, it may be more difficult for attacker system 130 to defeat monitoring on target system 110. Virtual machine kernel 330, meanwhile, may allow management of different virtual machine aspects (physical memory allocated to each VM, share of CPU(s) allocated to each VM, etc.).

Figure 4:
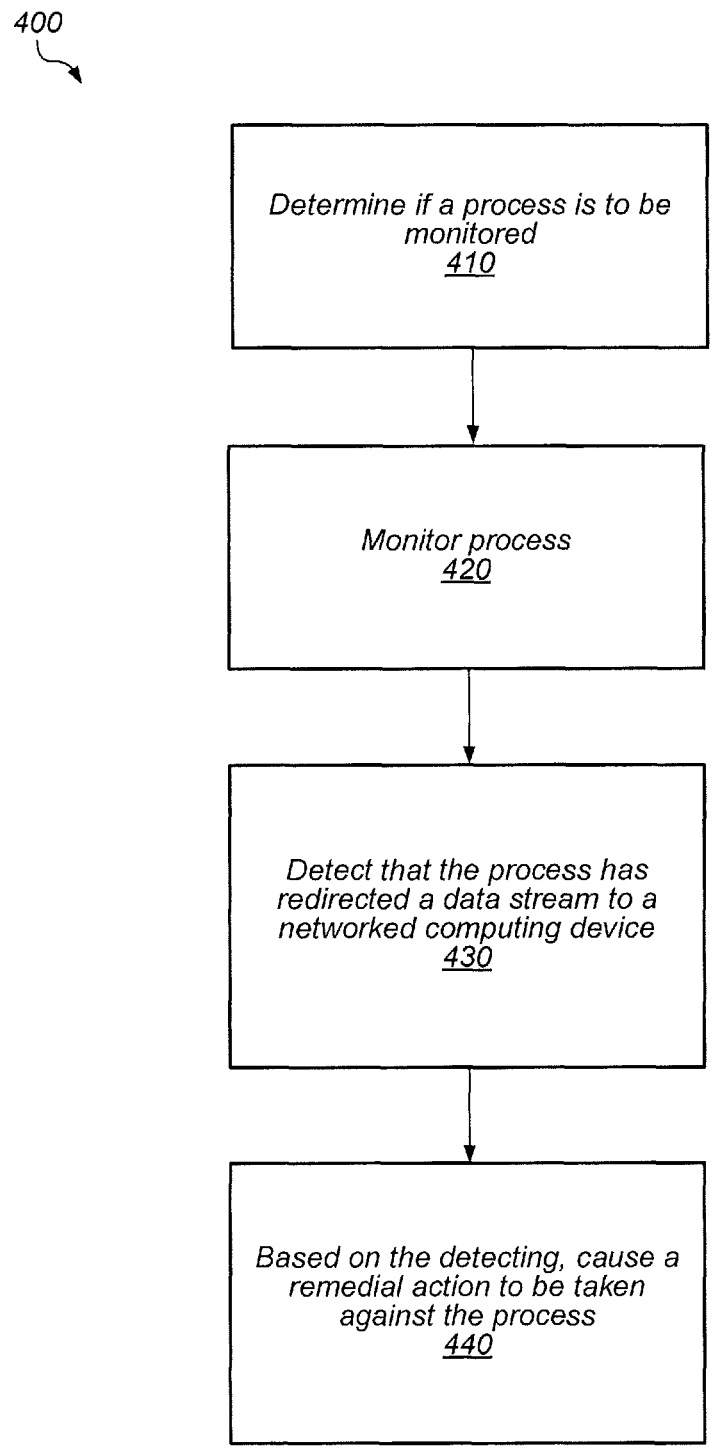
FIG. 4 illustrates a flowchart of a method that relates to detecting whether one or more data streams of a process have been redirected (which may indicate that the process is a reverse shell), according to some embodiments.

Turning to FIG. 4, a flowchart diagram is shown of one embodiment of a method 400 that relates to detecting whether one or more data streams of a process have been redirected (which may indicate, in some embodiments, that the process is a reverse shell). Any or all operations described in method 400 may be performed by monitor agent 250 on target system 110 in some embodiments, or another process running on any suitable computer system or electronic device in other embodiments. Note that in one or more embodiments, a different process beside monitor agent 250 may perform one or more operations of method 400, however, for ease of explanation, operations described below will refer to monitor agent 250 (as executing on target system 110).

In operation 410, monitor agent 250 determines if a process executing on target system 110 is to be monitored. This may include determining if the process is a command shell. Determining if a process is a command shell may be performed in various ways. In one embodiment, the process is determined to be a shell if its file system name matches a list of known shells for any operating system like: Linux (e.g., /bin/bash, /bin/tcsh, /usr/bin/bash, etc.), Windows (cmd.exe, PowerShell, etc.) and more.

In another embodiment, a process is determined to be a shell based on an analysis of at least a portion of contents of the process. For example, if the process has the exact same size and contents as another known shell, then the process will be considered to be a copy of that command shell. Thus, an attacker may not be able to avoid detection by simply copying one shell (e.g., /bin/bash) to another location on the file system and giving the copy a different file name.

However, an attacker could also copy a known shell and then attempt to alter the executable so that the executable still functions, but does not precisely match a pre-existing shell (e.g., changing one or more bytes of data; adding dead space or garbage data to portions of the executable that will not affect functionality, etc.). In this case, operation 410 may include analyzing different portions of the process to see if it matches a known shell. A hash function could be executed on the first portion of an unknown process (e.g., first 1000 bytes) and then compared to the results of a hash on the same portions of all other known command shells. This process could be repeated as desired, comparing hashes for second, third, fourth, etc., portions of an unknown process to hashes for respective portions of known shells. If one or more of those hashes match, the unknown process may be considered a command shell, and then monitored in operation 420. Fuzzy hashing techniques can also be employed to determine if a process matches a known shell. For example, in various embodiments in which fuzzy hashing is used, piecewise hashing is performed on different sections of a file to produce a result that can be used to measure similarity to the hash for a known shell. Making minor alterations in an executable shell may still result in a high similarity as measured by fuzzy hashing techniques, and thus, an attacker's attempt to disguise his executable could be foiled in this manner. For example, a fuzzy hash for a known version of cmd.exe could be the value 'as0d97yf-97234bzd', and the fuzzy hash for a hacker-altered version of cmd.exe might be 'as1d87yf-97234qzd'. These results share 14/17 of the same values and could therefore be considered a match. Different matching criteria and thresholds may be used in various embodiments.

In yet another embodiment, operation 410 includes analyzing observed behavior of an unknown process to determine if it should be monitored (e.g., if it is a command shell). Known command shells, for example, may tend to execute instructions in a certain manner or certain pattern. For each known command shell, that command shell can be observed over many different execution instances (by different users, on different machines, etc.) to determine how those command shells tend to behave. For example, particular instruction sequences may be executed repeatedly, corresponding to certain routines used by a command shell. If those same instruction sequences are observed by an unknown process, then it may be determined with a high probability to be a known command shell. Thus, comparing instruction execution sequences (e.g., did we see a LOAD, STORE, LOAD, STORE, SUB, SUB, ADD, ADD sequence twice in a row, or any other one of innumerable possible combinations) can reveal, via program behavior, if an unknown process is, in fact, a command shell. Observed behavior of a process may include reviewing resources used, opcode(s) executed on the CPU, system call(s) used, etc., in various embodiments.

Further, note that determining if a process is a command shell may include reducing false positives. A commonly used word processor, for example, could use a first series of instructions (perhaps repeatedly) that a command shell also uses. In this case, if an unknown process is flagged as a probable command shell based on that series of instructions, further checks could be performed to see if the unknown process is actually the word processor (or is instead a copy of the command shell). For example, if the first 1000 bytes (or any other portion) of the unknown program has a hash value corresponding to a known non-command shell program, then the unknown program may not be classified as a command shell that should be monitored. Various known programs that aren't command shells may therefore be observed for behavior, and their gathered behavior data can be used to reduce false positives in identifying whether a process is a command shell that should be monitored. More generally, if monitor agent 250 determines a process is not a command shell, it may decline to monitor that process.

Thus, operation 410 may allow monitor agent 250 to determine if an unknown process should be monitored, as further discussed below.

In operation 420, monitor agent 250 monitors a process that is executing on target system 110, in one embodiment. Operation 420 may therefore include observing the behavior of process 205, 210, 215, 220, or any other process by continually or periodically checking program state values, input or output data, use of various system resources, use of hardware, etc. (Multiple processes may, of course, be monitored). Monitoring may also include, in various embodiments, observing whether a data stream (e.g., STDIN/OUT/ERR) has been redirected to a networked computing device that is remote to target system 110.

In operation 430, monitor agent 250 detects that a process has redirected a data stream to a networked computing device. In one embodiment, this includes monitor agent 250 determining if one or more file descriptors for a running process have been set to point to a networked computing device. This may include determining that any one of STDIN, STDOUT, or STDERR have been re-directed to a network port, for example, rather than being set to a local device such as a keyboard or monitor. Operation 430 therefore includes, in one embodiment, periodically scanning a list of file descriptors for each of one or more processes to review settings for file descriptors 0, 1, and 2 (commonly STDIN, STDOUT, and STDERR, respectively, on many UNIX/Linux-like systems and more). In one embodiment, operation 430 includes detecting that a process has redirected a handle for an operating system input or output stream (e.g., on a Windows-based system in which handles are used). Thus, operation 430 may detect redirection of a file descriptor or handle in various embodiments. Operation 430 may also include, in some embodiments, intercepting or monitoring a system call that is made to re-direct a data stream (e.g., monitor agent 250 could be set to look at certain system calls as they occur). In one instance, operation 430 includes detecting that all three standard operating system data streams have been re-directed, while in other instances, operation 430 includes detecting that one or more of the three standard operating system data streams (STDIN/OUT/ERR) have been re-directed.

Note that in some embodiments, operation 430 includes deliberately not monitoring certain processes that are executing on target system 110. Certain processes may be whitelisted (on the filesystems and in memory), for example, to avoid false positives or enhance system performance. A specified list of processes, or processes with certain attributes, can be whitelisted for monitor agent 250, which can then utilize monitoring resources more effectively on remaining processes that have a higher chance of being an instance of a reverse shell.

Operation 430 includes, in one embodiment, using memory dumps to detect if a process has redirected a data stream. Thus, operation 430 may include capturing dumps of at least a portion of system memory for the computer system at a plurality of time intervals. The memory capture can be performed by monitor agent 250, or in other embodiments, could be performed wholly or in part by a custom hardware device installed on target system 110. Thus, even in non-virtual machine situations where an operating system is running directly on system hardware, the hardware device can allow detection where a software-based detection solution could be foiled by an attacker. Operation 430 may also include using virtual machine introspection (as discussed above) to perform detection of one or more data stream re-directs for a process running within a virtual machine.

In operation 440, monitor agent 250 causes a remedial action to be taken against a monitored process that has had a data stream re-directed, in the embodiment of FIG. 4. Thus, operation 440 includes taking an action against a process that has been determined to be a reverse shell, in various embodiments. In general, an action taken against a process determined to be a reverse shell may include mitigating that process's access to network or system resources and/or sending an alert.

A number of different remedial actions are possible relative to operation 440. One possible remedial action is to block incoming data from a networked computing device from reaching a process. Thus, a malicious user of attacker system 130 might send commands to target system 110 to be executed, but those commands would never be executed (e.g., because the data is blocked from reaching the active process). The malicious user would not receive any data in reply, in various embodiments. Another remedial action that can be taken is killing the process that has been determined to be a reverse shell (thereby preventing malicious access). Another remedial action is logging commands and actions taken by the suspected reverse shell process (e.g., to see what a malicious user may be attempting to do). Another possible remedial action includes sending an electronic notification to a system administrator (or another party) regarding a possible security breach at target system 110. For example, an email, SMS text message, or other communication can be transmitted that includes various details such as the name and/or path of the process in question, how long it has been running, a log of commands or attempted commands that have occurred, network address of attacker system 130 (if available), etc. Further, note that two or more remedial actions may be taken in different embodiments (such as killing a process and also sending a message alerting a system administrator, for example). A security policy specified by an administrator or other entity may list particular remedial actions to be taken in particular circumstances (e.g., if a perceived attacking network device is from the United States, take these one or more actions, if a perceived attacking network device is from a foreign country, take these one or more different actions, if the process is believed to be the tcsh shell, take certain actions, or if the process is believed to be the bash shell, take one or more different actions, etc.) In general, a specified security policy may check on a variety of different conditions and factors as a basis for determining which particular remedial action(s) should be taken against a process.

Computer-Readable Medium

Figure 5:
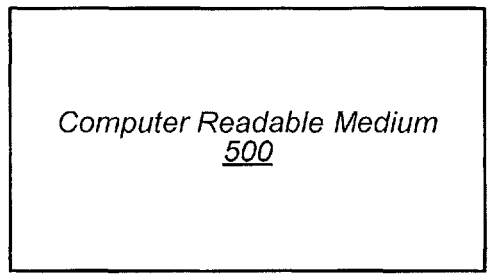
FIG. 5 is a block diagram of one embodiment of a computer readable medium.

Turning briefly to FIG. 5, a block diagram of one embodiment of a computer-readable medium 500 is shown. This computer-readable medium may store instructions corresponding to the operations of FIG. 4 and/or any techniques described herein. Thus, in one embodiment, instructions corresponding to monitor agent 250 may be stored on computer-readable medium 500.

Program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

Figure 6:
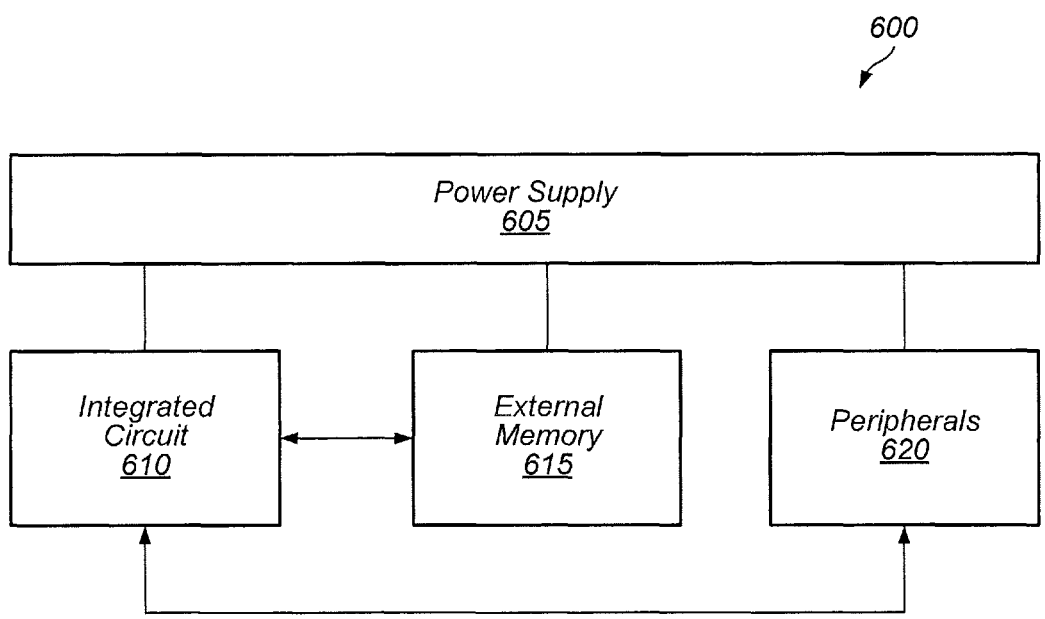
FIG. 6 is a block diagram of one embodiment of a system.

In FIG. 6, one embodiment of a computer system 600 is illustrated. Various embodiments of this system may be target system 110, firewall 120, attacker system 130, or any other computer system as discussed above and herein.

In the illustrated embodiment, system 600 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as wifi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    analyzing at least a portion of contents of a process executing on a computer system or observing patterns in execution instances of the process, wherein the analyzing comprises:
        determining a plurality of hash values from a plurality of code portions from different sections of the at least the portion of contents;
        generating a fuzzy hash of the plurality of hash values using a fuzzy hashing technique;
        comparing the fuzzy hash to a plurality of known fuzzy hashes for a plurality of first hash values for blacklisted command shell processes, wherein the plurality of first hash values are determined from portions of the blacklisted command shell processes that correspond to the different sections of the at least the portion of contents; and determining that the process is a potential command shell based on a number of matching values between the fuzzy hash and the plurality of known fuzzy hashes from the comparing;

based on at least one of the analyzing or the observing, monitoring the process on the computer system;

in response to the monitoring, detecting that the process has redirected a file descriptor or a handle for an operating system output stream from a hardware display device of the computer system to a networked computing device and that the process has redirected a file descriptor or a handle for an operating system input stream from a hardware input device of the computer system to the networked computing device; and based on the detecting, causing a remedial action to be taken against the process executing on the computer system pursuant to a specified security policy.

2. The method of claim 1, wherein the detecting further comprises detecting that the computer system has redirected a file descriptor or a handle for a second operating system output stream to the networked computing device; and
wherein the operating system output stream is STDOUT, the second operating system output stream is STDERR, and the operating system input stream is STDIN.

3. The method of claim 1, wherein detecting that the process has redirected the file descriptor or the handle for the operating system output stream comprises detecting that output data has been sent to a network resource on the computer system that transmits data via a network adapter hardware device.

4. The method of claim 1, wherein the determining that the process is the potential command shell further comprises determining that the process allows user commands to be executed on the computer system.

5. The method of claim 1, wherein the remedial action includes blocking incoming data from the networked computing device from reaching the process.

6. The method of claim 1, wherein the remedial action includes killing the process.

7. The method of claim 1, wherein the remedial action includes sending an electronic notification to an administrator regarding a possible security breach at the computer system.

8. The method of claim 1, further comprising monitoring one or more but not all of a plurality of processes executing on the computer system to determine if data streams for the one or more processes are being redirected, wherein unmonitored ones of the plurality of processes are on a process whitelist.

9. The method of claim 8, wherein the monitoring is performed by an agent monitoring process that is executing on the computer system.

10. A non-transitory computer-readable medium having instructions stored thereon that are executable by a computer system to cause the computer system to perform operations comprising:

determining that a process executing on the computer system is to be monitored based on at least one of an analysis of at least a portion of executable contents of the process or an observed behavior of the process, wherein the determining that the process executing on the computer system is to be monitored based on the analysis of the at least the portion of executable contents of the process comprises:

determining a plurality of hash values from a plurality of code portions from different sections of the at least the portion of executable contents;

generating a fuzzy hash of the plurality of hash values using a fuzzy hashing technique;

comparing the fuzzy hash to a plurality of known fuzzy hashes for a plurality of hash values for blacklisted command shell processes, wherein the plurality of hash values are determined from corresponding portions of the blacklisted command shell processes that correspond to the different sections of the at least the portion of executable contents; and determining that the process is a potential command shell based on a number of matching values between the fuzzy hash and the plurality of known fuzzy hashes from the comparing;

monitoring the process on the computer system;

in response to the monitoring, detecting that the process has redirected at least one of:
an output stream, to transmit data to a networked computing device; or
an input stream, to receive data from the networked computing device; and based on the detecting, causing a remedial action to be taken against the process pursuant to a specified security policy.

11. The non-transitory computer-readable medium of claim 10, wherein the operations further comprise performing the detecting by capturing dumps of at least a portion of a system memory for the computer system at a plurality of time intervals.

12. The non-transitory computer-readable medium of claim 10, wherein the determining that the process is the potential command shell comprises determining that the process is to be monitored for file stream redirections.

13. The non-transitory computer-readable medium of claim 12, wherein the determining that the process is the potential command shell is further based on at least one of the following: a file system name of the process or the analysis of at least the portion of executable contents of the process.

14. The non-transitory computer-readable medium of claim 12, wherein the determining that the process is the potential command shell is further based on the observed behavior of the process over a period of time, and wherein the observed behavior comprises patterns in executable instances.

15. The non-transitory computer-readable medium of claim 10, wherein the detecting includes using virtual machine introspection to monitor one or more aspects of one or more processes executing on the computer system within a virtual machine.

16. A system, comprising:
a processor; and
a non-transitory computer-readable storage medium having instructions stored thereon that are executable by the processor to cause the system to perform operations comprising:

determining that a process executing on a computer system is to be monitored based on at least one of an analysis of at least a portion of contents of the process or observed patterns in execution instances of the process, wherein the determining that the process executing on the computer system is to be monitored based on the analysis of the at least the portion of executable contents of the process comprises:

determining a plurality of hash values from a plurality of code portions from different sections of the contents;

generating a fuzzy hash of the plurality of hash values using a fuzzy hashing technique;

comparing the fuzzy hash to a plurality of known fuzzy hashes for a plurality of hash values for blacklisted command shell processes, wherein the plurality of hash values are determined from portions of the blacklisted command shell processes that correspond to the different sections of the contents; and determining that the process is a potential command shell based on a number of matching values between the fuzzy hash and the plurality of known fuzzy hashes from the comparing;

monitoring the process on the computer system;

in response to the monitoring, detecting that the process has redirected at least two of:

a standard output stream, to transmit data to a networked computing device;

a standard error output stream, to transmit data to the networked computing device; or a standard input stream, to receive data from the networked computing device; and based on the detecting, causing a remedial action to be taken against the process pursuant to a specified security policy.

17. The system of claim 16, wherein the operations further comprise monitoring one or more but not all of a plurality of processes executing on the computer system to determine if data streams for the one or more processes are being redirected, wherein unmonitored ones of the plurality of processes are on a process whitelist.

18. The system of claim 16, wherein the operations further comprise performing the detecting based on a dump of contents of at least a portion of a system memory.

19. The system of claim 18, wherein the remedial action includes blocking outgoing data from the process to the networked computing device on at least one of the standard output stream or the standard error output stream.

20. The method of claim 1, wherein the analyzing further comprises:

determining a hash value from a code portion of the contents; and comparing the hash value to a plurality of second hash values for the blacklisted command shell processes, wherein the plurality of second hash values are determined from portions of the blacklisted command shell processes that correspond to the code portion of the contents, wherein the determining that the process is the potential command shell is further based on the comparing the hash value to the plurality of second hash values.

* * * * *